Figure 1:
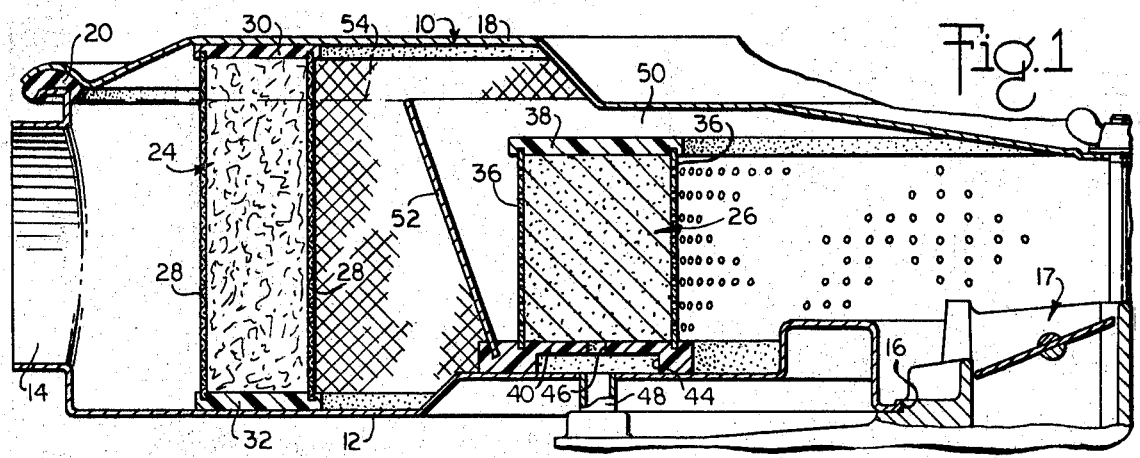

United States Patent

[11] 3,572,013

[72] Inventor Gunnar W. Hansen
  Ypsilanti, Mich.
[21] Appl. No. 769,584
[22] Filed Oct. 22, 1968
[45] Patented Mar. 23, 1971
[73] Assignee Ford Motor Company
  Dearborn, Mich.

[54] FUEL VAPOR EMISSION CONTROL
  6 Claims, 5 Drawing Figs.
[52] U.S. Cl. .................................................... 55/316,
  55/387, 55/482, 55/510, 123/136
[51] Int. Cl. .................................................... B01d 50/00
[50] Field of Search .......................................... 55/316,
  387, 388, 389, 500, 498, 510, 482, 259; 123/136

[56] References Cited
  UNITED STATES PATENTS
  2,122,111  6/1938  Poelman et al. ............... 55/316
  2,608,269  8/1952  Briggs .......................... 55/316
  2,717,585  9/1955  Bradshaw ..................... 123/119B
  2,896,742  7/1959  McMichael ................... 55/276
  2,996,145  8/1961  Thornburgh .................. 55/498
  3,171,726  3/1965  Roney et al. .................. 55/387
  3,186,391  6/1965  Kennedy ....................... 55/482
  3,221,724  12/1965 Wentworth .................... 123/136
  3,313,281  4/1967  Schneider ..................... 123/119B
  3,368,326  2/1968  Hervert ........................ 123/136
  3,448,731  6/1969  Daigh ........................... 123/120
    FOREIGN PATENTS
   153,865  10/1953  Australia ...................... 55/51

Primary Examiner—Frank W. Lutter
Assistant Examiner—Bernard Nozick
Attorneys—John R. Faulkner and Robert E. Mc Collum ABSTRACT: An engine air cleaner has a ringlike carbon bed filter element to absorb fuel vapors, a baffle member assuring saturation of the filter before vapor breakthrough to the atmosphere, the filter element being desorbed or purged of the vapors during normal air flow through the air cleaner.

INVENTOR.
GUNNAR W. HANSEN
BY John R. Faulkner
Robert E. McCollum
ATTORNEYS

INVENTOR.
GUNNAR W. HANSEN
BY John R. Faulkner
Robert E. McCollum
ATTORNEYS

FUEL VAPOR EMISSION CONTROL

This invention relates, in general, to an internal combustion engine. More particularly, it relates to a fuel vapor emission control in the air cleaner for such an engine.

Air cleaner constructions for automotive type engines are known in which two concentrically mounted filter elements are provided, with a flow of fuel vapors either into the space between the two or into one of the filter elements. It is also known to use a pleated paper type air filter element for the radially outermost filter, and a bed of activated carbon for the innermost filter. The carbon particles adsorb the fuel vapors supplied thereto during a hot soak cycle of the engine, and are purged of these vapors during normal operation of the engine causing a pressure drop from the inlet to the outlet of the air cleaner and thereby an airflow through the carbon element to the carburetor.

It has been found in constructions of the above type that during the adsorption cycle, since the hydrocarbon elements are heavier than air and the air inlet opening is essentially at the same horizontal level as the carbon filter element, vapor breakthrough may occur out of the carbon filter element through the paper element in a reverse direction through the air inlet out into the atmosphere. That is, since the buildup of fuel vapors adsorbed by the carbon filter element seeks its own level in a manner similar to that of water, should breakthrough occur because of a saturation of the lower portion of the carbon filter element, the fuel vapors would tend to flow from the clean to the dirty side of the outermost filter element, and therefrom out the air cleaner inlet.

The above action is disadvantageous for a number of reasons. One is that the carbon filter element is not efficiently utilized in that only a portion of the carbon particles may react with the fuel vapors before vapor breakthrough may occur. Secondly, if breakthrough occurs in the manner described, the emission of unburned hydrocarbons into the atmosphere results, which is undesirable.

The invention overcomes the above disadvantages by providing an annular baffle member radially outwardly of a carbon filter element and of an axial width or height greater than the thickness of the carbon filter element so that if fuel vapor breakthrough should occur, the fuel vapors are maintained confined and communicated to the atmosphere only after the capacity of the carbon bed filter element is exceeded.

It is an object of the invention, therefore, to provide an air cleaner assembly with a vapor barrier adjacent an activated carbon bed filter element to retard fuel vapor breakthrough to the atmosphere until the adsorption capacity of the carbon bed filter element is exceeded.

It is another object of the invention to provide a fuel vapor emission control consisting of an annular baffle located in the air cleaner of an engine adjacent an activated carbon bed to constitute a dam to retard fuel vapor breakthrough to the atmosphere until a predetermined vapor level is obtained.

Other objects, features and advantages of the invention will become more apparent upon reference to the succeeding detailed description thereof, and to the drawings illustrating the preferred embodiments thereof; wherein, FIG. 1 is a cross-sectional view of one-half of an air cleaner assembly embodying the invention; and, FIGS. 2, 3, 4 and 5 are cross-sectional views of modifications of the FIG. 1 drawing.

FIG. 1, which is essentially to scale, shows, in general, a typical automotive type air cleaner housing 10. It includes a generally dish shaped bottom tray portion 12 having a side inlet 14 in a vertical wall portion, the inlet normally being connected to a snorkel type, sound attenuating, inlet extension, not shown. Tray portion 12 has an axial opening 16 adapted to cooperate with the air horn portion 17 of the induction passage of a conventional down draft type carburetor for the discharge of fresh filtered air into the carburetor proper. The upper open part of tray 12 is closed by an annular cover 18 separated from the tray portion by an annular seal 20. The air cleaner assembly as a whole is held to the carburetor in a known manner by a bail member, not shown, that projects through the cover and is secured thereto by a wingnut.

A pair of radial flow filter elements 24 and 26 of different axial widths are concentrically mounted within the air cleaner assembly on stepped diameter portions of tray 12. The outermost element 24 may be of a known type. It can consist, for example of an annular pleated paper element held between a pair of mesh screen members 28 rigidly secured in a pair of annular end portions 30, 32 of plastic or other suitable material. The pleated paper would have a porocity permitting a controlled air flow therethrough with a filtering of foreign matter in the air therefrom, in a known manner. The axial thickness of filter element 24 is such that it is sandwiched between the bottom of tray 12 and the cover 18 in a sealing manner so that all air passing through inlet 14 must also pass through filter element 24.

The second element 26 constitutes an annular filter of adsorbent material, such as, for example, a bed of activated carbon particles of a size chosen to provide a controlled air flow through filter element 26. That is, the size will determine the adsorption capacity as well as the restriction to flow of air therethrough. The particles in this case are entrained between a pair of mesh screens 36 having their edges imbedded in annular end members 38 and 40. The inner end member 40 is channel-shaped in cross section to define an annular manifold 44. The latter is connected by a plurality of circumferentially spaced apertures 46 to the bed of activated carbon particles. The opposite portion of manifold 44 is connected to a tube or vent 48 adapted to contain fuel vapors emanating from the carburetor fuel bowl. The inner end member 40 has a sealing engagement with the air cleaner tray member 12.

In this case, the thickness of inner filter element 26 is less than that of the outer element 24 or the vertical height of the air cleaner housing so as to provide a a controlled air bypass space or passage 50 between the outer portion of filter element 26 and the housing. This annular clearance space 50 constitutes an orifice that is in parallel with the orifice created by the restriction to flow through inner filter element 26. As will be clear, the size of the air bypass passage automatically controls the restriction to flow through the bypass, and, therefore, the flow of air through and the purge of fuel vapors from filter element 26, without the use of valving, as a function of air flow through the air cleaner.

Completing the construction, the air cleaner assembly includes an annular baffle member 52 concentrically mounted in the inner end cap 40 of element 26 and radially located between the inner and outer filter elements. The baffle member 52 also extends vertically (axially), as shown, a distance greater than the height of filter element 26, for a purpose to be described.

Further details of construction and operation of the air cleaner assembly are not given since they are known and are believed to be unnecessary for an understanding of the invention.

In operation, when the engine is stopped either in a high ambient temperature area or after the engine has warmed up, the fuel in the carburetor fuel bowl will absorb the heat of operation of the engine during the so called hot soak period. This causes the fuel in these areas to vaporize and further pressurize the area above the liquid fuel so that fuel vapors are driven off into the fuel vapor vent line 48. With no air flow through the air cleaner, the fuel vapors flow into manifold 44 and therearound and through outlets 46 up into filter element 26. There, they are adsorbed by the carbon particles therein.

Assuming that this fuel vapor pressurization condition continues, the fuel vapors will saturate the closet carbon particles first and subsequent fuel vapors will continue outwardly to the remaining particles. However, should the resistance outward flow become greater than the resistance to flow of the fuel vapors radially out of the filter element towards the inlet, vapor breakthrough will be prevented from flowing toward the air cleaner inlet by annular baffle means 52. Accordingly, even though vapor breakthrough should occur, the fuel vapor level must build up to a point where not only will filter element 26 be saturated, but the vapor level will be beyond and cover the bypass clearance space 50 and be above the level of the inlet to the air cleaner means, as indicated by the dotted line 54 in the FIG., before vapor breakthrough to the atmosphere will occur. Accordingly, it will be seen that if vapor breakthrough should occur, no fuel vapors will be admitted out into the atmosphere until after the activated carbon filter element is saturated with fuel vapors. This provides efficient control of the emission of fuel vapors, and efficient operation of the carbon bed filter element.

Therefore, as soon as the engine is started, the depression in the intake portion 17 of the carburetor will cause a pressure differential between the air at the inlet 14 to the air cleaner and that at the carburetor causing air flow into the carburetor. This, of course, creates a pressure in differential between the fuel vapor pressure and the air pressure in the air cleaner passages so that fuel vapor will continue to flow out through the filter element 26. Fuel vapors, therefore, will be purged or desorbed from the filter element 26 by the flow of air through the air cleaner inlet 14 and radially through the filter elements 24 and 26 into the carburetor. The inclusion of bypass passage 50, of course, controls the purge of fuel vapors as a function of air flow, the size of the orifice 50 and the orifice through element 26.

Figure 2:
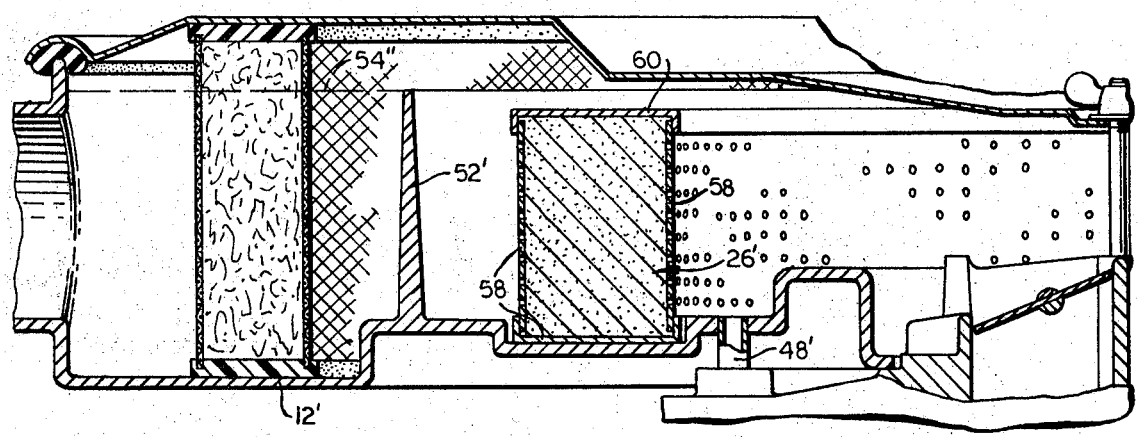

FIGS. 2, 3, 4 and 5 show modified constructions of the annular baffle means; however, the overall operation of the adsorption and desorption of the fuel vapors is essentially the same as that described above. In FIG. 2, the concentric baffle 52', in this case, is formed as an integral portion of the bottom of the air cleaner tray 12'. Also, the inner filter element 26' consists of a bed of activated carbon confined within three annular screens 58 enclosed by an annular sheet metal member 60. The fuel vapor inlet 48', in this case, is offset downstream from the filter element 26, although it could open into the bottom of the filter element through the lower screen portion 58.

Figure 3:
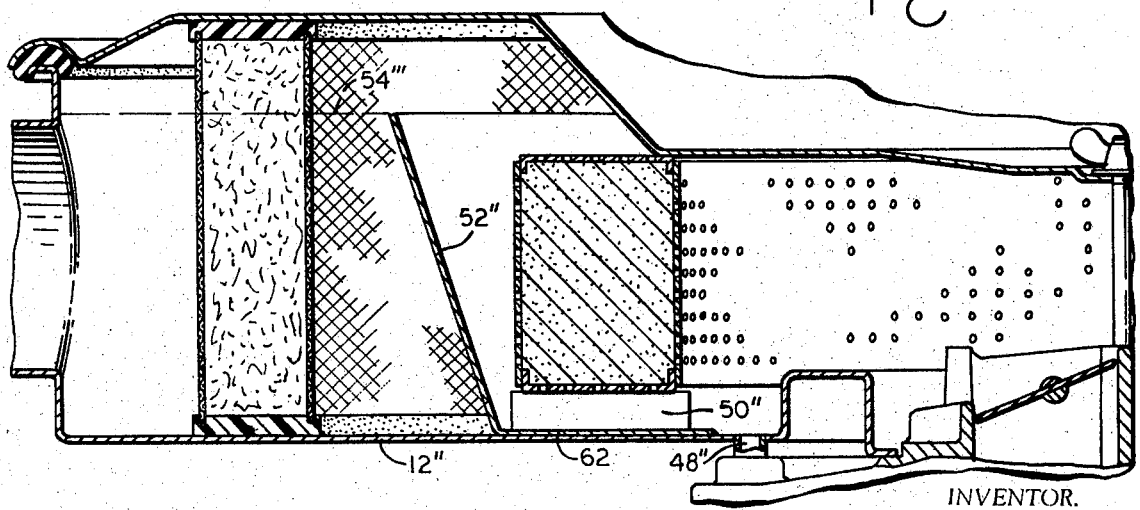

The design shown in FIG. 3 differs from the previous designs in that the inner annular baffle member 52''' is angled similar to FIG. 1 but is formed as an extension of a sheet metal portion secured to the bottom of tray 12'''. In this case, the bottom baffle portion 62 is formed with a number of circumferentially corrugated portions providing the restricted bypass passage 50'' on the bottom rather than on the top as shown in FIG. 1.

Figure 4:
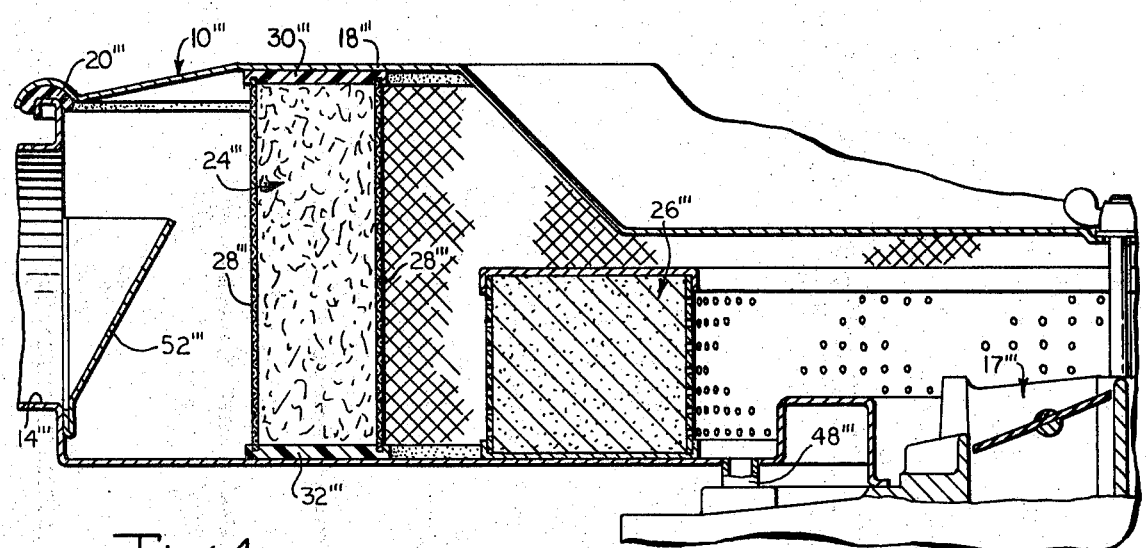

FIG. 4 shows a further modification in which the annular baffle 52'''' is attached to the air cleaner tray portion 12''' adjacent the inlet 14 and radially outwardly of the pleated paper filter element 24. This has the advantage of providing a higher vapor capacity to the air cleaner element and reduced vapor loss to the atmosphere by providing a more tortuous path for the fuel vapors to follow before being expelled to the atmosphere.

Figure 5:
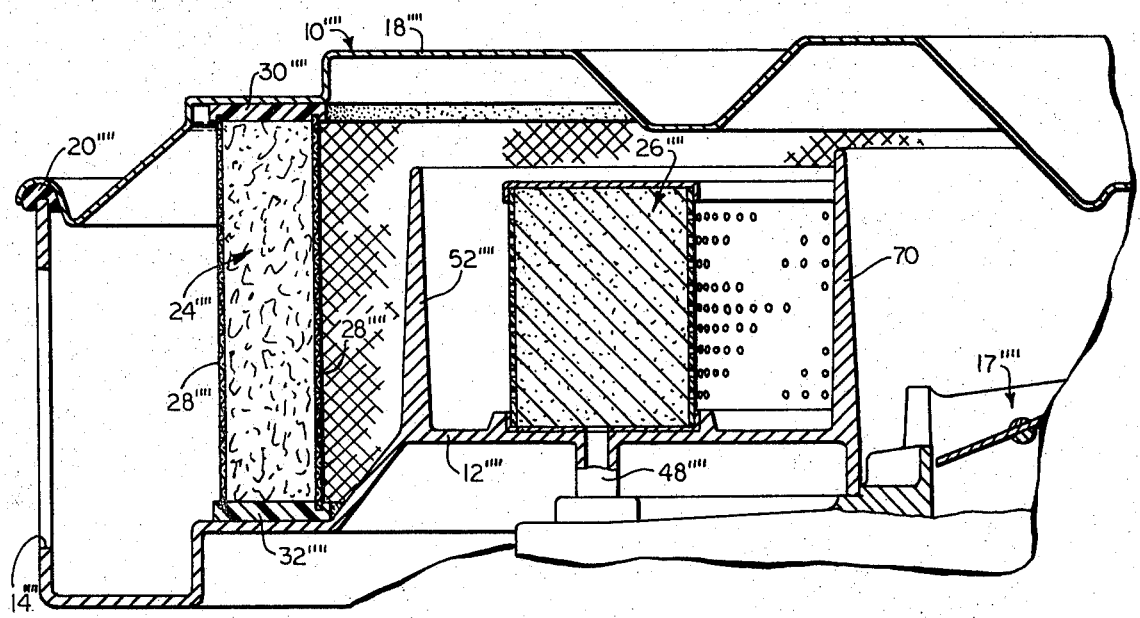

FIG. 5 shows a still further modification in which an additional annular concentric baffle 70 is provided downstream of the carbon bed filter element so as to minimize the accessibility of fuel vapor breakthrough to the carburetor as well as to the air cleaner inlet portion. In this instance, the additional baffle is formed as a portion of the tray 12''''' of the air cleaner, although it will be clear that it could be an addition secured to the tray be any suitable means. Once again, the fuel vapor containing conduit 48 communicates with the bottom portion of the carbon bed filter element. With this design, air flow will occur towards the carburetor, and fuel vapor breakthrough to the atmosphere or to the carburetor will not occur until the fuel vapor level well exceeds the capacity of the filter element 26'''''.

From the foregoing, therefore, it will be seen that the invention provides a construction that will insure that the entire carbon bed filter element is exposed to fuel vapors before vapor breakthrough to either the atmosphere or to the carburetor inlet may occur.

While the invention has been shown and described in its preferred embodiments, it will be clear to those skilled in the arts to which it pertains that many changes and modifications may be made thereto without departing from the scope of the invention.

I claim:

1. An engine air cleaner assembly comprising an essentially horizontally disposed hollow annular housing defined by a tray member and a cover member mounted thereon and having a side fresh air inlet and an axially disposed outlet, a pair of concentrically mounted ring filter elements disposed in said housing, the outer of said filter elements extending between the tray and cover members in substantially sealing engagement therewith, the inner of said elements extending from one of said members towards the other and having an axial thickness less than the thickness of said outer element and less than the depth of said housing whereby an air bypass passage is formed between said housing and inner element, said inner element also having an activated carbon bed connected through a portion of said housing to a source of fuel vapors for adsorption thereof and desorption thereof upon flow of air through said bed, and annular baffle means sealingly secured to said tray member radially outwardly of said inner filter element and extending in a generally vertical direction for controlling the flow of fuel vapors from said inner filter element radially outwardly thereof towards said inlet.

2. An assembly as in claim 1, said baffle means extending vertically beyond the thickness of said inner element to assure saturation of said carbon bed with fuel vapors before overflow of vapors towards said inlet.

3. An assembly as in claim 1, said baffle means being sealingly secured to said housing adjacent said inlet.

4. An assembly as in claim 1, said baffle means being sealingly secured to said housing between said elements.

5. An assembly as in claim 1, including additional annular baffle means secured to said housing radially inwardly of said inner element to retard flow of vapors towards said outlet.

6. An assembly as in claim 7, said additional baffle means extending vertically beyond the thickness of said inner element.